(12) United States Patent
Massicot et al.

(10) Patent No.: US 10,404,886 B2
(45) Date of Patent: Sep. 3, 2019

(54) METHOD OF RENDERING A DOCUMENT SECURE

(71) Applicant: ADVANCED TRACK AND TRACE, Rueil-Malmaison (FR)

(72) Inventors: Jean-Pierre Massicot, Rueil-Malmaison (FR); Alain Foucou, Rueil-Malmaison (FR); Zbigniew Sagan, Rueil-Malmaison (FR)

(73) Assignee: Advanced Track & Trace, Rueil-Malmaison (FR)

( * ) Notice: Subject to any disclaimer, the term of this patent is extended or adjusted under 35 U.S.C. 154(b) by 70 days.

(21) Appl. No.: 15/122,146

(22) PCT Filed: Feb. 27, 2015

(86) PCT No.: PCT/EP2015/054213
§ 371 (c)(1),
(2) Date: Aug. 26, 2016

(87) PCT Pub. No.: WO2015/132166
PCT Pub. Date: Sep. 11, 2015

(65) Prior Publication Data
US 2016/0373605 A1 Dec. 22, 2016

(30) Foreign Application Priority Data
Mar. 3, 2014 (FR) ...................................... 14 51700

(51) Int. Cl.
*H04N 1/32* (2006.01)
*G07D 7/20* (2016.01)
(Continued)

(52) U.S. Cl.
CPC .......... *H04N 1/3232* (2013.01); *B42D 25/29* (2014.10); *B42D 25/405* (2014.10);
(Continued)

(58) Field of Classification Search
None
See application file for complete search history.

(56) References Cited

U.S. PATENT DOCUMENTS 6,871,789 B2 * 3/2005 Hilton ................. G06Q 20/042
235/487
8,736,910 B2 * 5/2014 Sagan ..................... B41M 3/10
358/1.16

(Continued)

FOREIGN PATENT DOCUMENTS

FR 2 925 195 A1 6/2009
WO 2008/009826 A1 1/2008

*Primary Examiner* — Paul F Payer
(74) *Attorney, Agent, or Firm* — Patshegen IP LLC; Moshe Pinchas

(57) ABSTRACT

A method of integrating a mark in a document. A frame to be printed is selected. At least one color of the selected frame is selected. A color density for each selected color for the selected frame is determined. A digital code is selected for each selected color. After printing, the digital code includes the density of the color. and is integrated into the frame of the corresponding color. The frame including the digital code is printed. Preferably, the digital code is a digital anti-copy mark designed to form, following the printing step, a printed anti-copy mark with an error rate of more than five percent.

10 Claims, 1 Drawing Sheet

(51) Int. Cl.
*B42D 25/405* (2014.01)
*B42D 25/29* (2014.01)
*G07D 7/005* (2016.01)
*G07D 7/2033* (2016.01)
*G06K 19/06* (2006.01)
*G06K 19/10* (2006.01)
*G06K 1/12* (2006.01)
*G06K 19/18* (2006.01)

(52) U.S. Cl.
CPC ... *G06K 19/0614* (2013.01); *G06K 19/06103* (2013.01); *G06K 19/10* (2013.01); *G07D 7/005* (2017.05); *G07D 7/0053* (2013.01); *G07D 7/20* (2013.01); *G07D 7/2033* (2013.01); *H04N 1/3216* (2013.01); *H04N 1/32309* (2013.01); *G06K 1/123* (2013.01); *G06K 19/06178* (2013.01); *G06K 19/18* (2013.01); *H04N 2201/3235* (2013.01)

(56) References Cited

U.S. PATENT DOCUMENTS

| | | | |
|---|---|---|---|
| 8,830,533 B2 * | 9/2014 | Fan | G06K 19/06103 |
| | | | 345/589 |
| 9,681,020 B2 * | 6/2017 | Goktekin | H04N 1/32203 |
| 2011/0038012 A1 * | 2/2011 | Massicot | H04N 1/32133 |
| | | | 358/3.28 |
| 2012/0327450 A1 * | 12/2012 | Sagan | G03G 21/046 |
| | | | 358/1.14 |

* cited by examiner

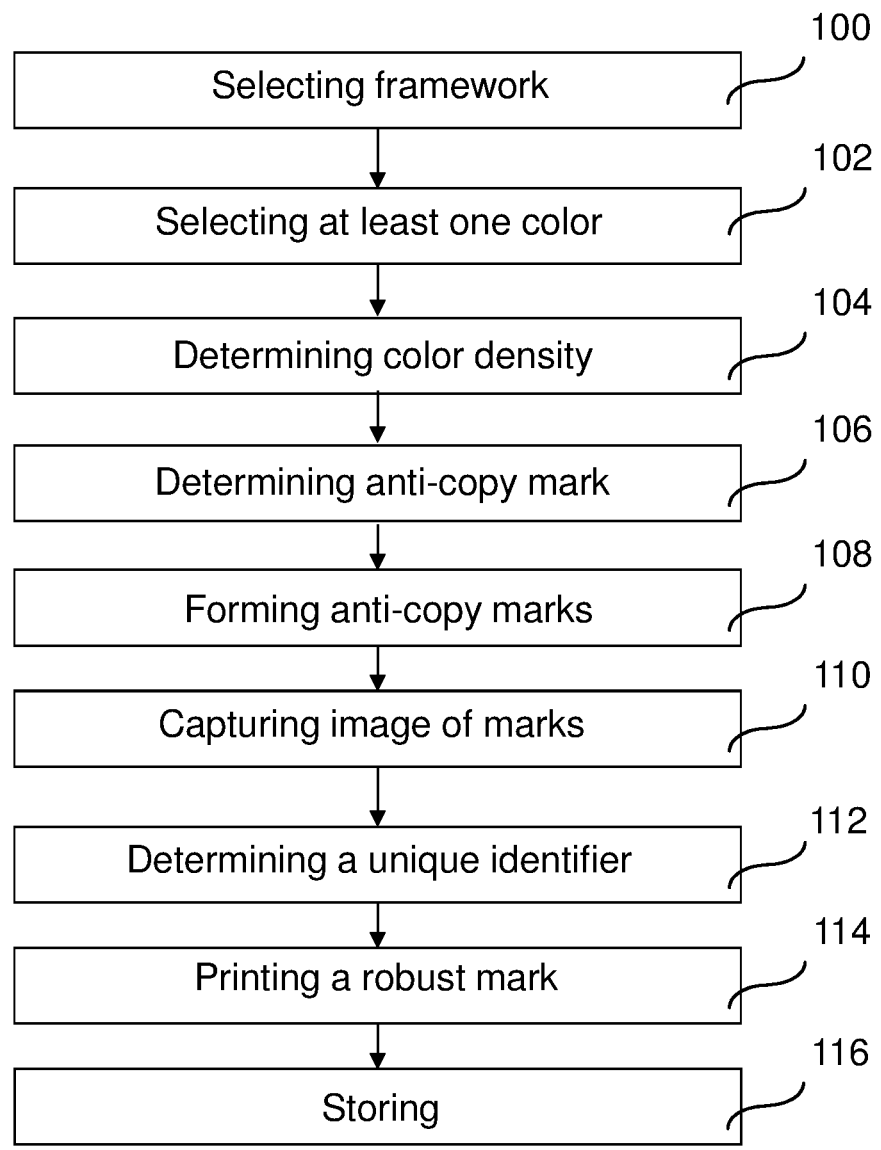

METHOD OF RENDERING A DOCUMENT SECURE

RELATED APPLICATIONS

This application is a § 371 application from PCT/EP2015/054213 filed Feb. 27, 2015, which claims priority from French Patent Application No. 14 51700 filed Mar. 3, 2014, each of which is incorporated herein by reference in its entirety.

TECHNICAL FIELD OF THE INVENTION

This invention concerns a method and a device for securing a document. It applies, in particular, to security documents so as to authenticate them.

STATE OF THE ART

There are many known ways of protecting content or a message carried on a medium. For example, encoding or encryption is applied to the data making up this message. However, simply knowing the decoding or decryption key makes it possible to access the message. Yet, these keys must be stored on media, eg paper, plastic or electronic, or on servers. Irrespective of whether these keys are carried by the user or stored in a computer system, a malicious third party with the right tools can reach them.

These protections are therefore inadequate.

SUBJECT OF THE INVENTION

The present invention aims to remedy all or part of these drawbacks.

To this end, according to a first aspect, the present invention envisages a method for incorporating a mark in a document, which comprises:
  a step of selecting a framework to be printed;
  a step of selecting at least one color of the selected framework;
  a step of determining a color density of each color selected for the selected framework;
  for each color selected, a step of determining a digital code having, after printing, said density of said color; and
  a step of incorporating said digital code into the framework of the corresponding color; and
  a step of printing said framework comprising said code.

Thanks to these provisions, a code, invisible to the naked eye because it has the same color density as the document's regular framework, is incorporated into a document.

In some embodiments, said digital code is a digital anti-copy mark configured to form, after the printing step, a printed anti-copy mark with an error rate superior to five percent.

In some embodiments, during the step of determining the digital anti-copy mark, the digital anti-copy mark is determined based on the printing system implemented during the printing step.

In some embodiments, the anti-copy mark is formed of a matrix of square or rectangular cells that take a state among a plurality of predefined states, the dimensions of said cells causing, after the step of printing with the printing system under consideration, a rate of error cells superior to five percent, an error cell being a cell that, on over more than half of its surface, has an error state compared to the corresponding cell in the digital matrix of the digital anti-copy mark.

In some embodiments, the digital anti-copy mark comprises redundancies.

In some embodiments, the rate of redundancies of the digital anti-copy mark is superior to five.

In some embodiments, the method that is the subject of the present invention comprises a step of capturing an image of the printed anti-copy mark, a step of determining an error rate by processing the captured image, a step of determining a unique identification of the printed anti-copy mark by processing the captured image, and a step of storing the error rate and the unique identification of the printed anti-copy mark.

In some embodiments, the method that is the subject of the present invention comprises, in a printer-scanner, the step of printing and the step of capturing an image during the same relative motion of a sheet in front of the printing means and of the scanner's sensor.

In some embodiments, the method that is the subject of the present invention comprises a step of printing a copy-robust mark that represents the unique identifier and/or the error rate of the anti-copy mark.

In some embodiments, the method that is the subject of the present invention comprises, during the step of determining the numeric code, a step of compensating the variation in color density due to printing said code compared to printing a regular framework.

According to a second aspect, the present invention envisages a method of archiving a document made according to the method of incorporation that is the subject of the present invention, which comprises a step of reading the printed code and a step of storing an image of the document and an image of the code that was read.

As the features, advantages and aims of this archive method are similar to those of the integration method that is the subject of the present invention, they are not repeated here.

BRIEF DESCRIPTION OF THE FIGURES

Other advantages, aims and particular features of the present invention will become apparent from the description that will follow, made, as a non-limiting example, with reference to the drawings included in an appendix, in which FIG. 1 represents, in the form of a logical diagram, steps in a particular embodiment of the method that is the subject of the present invention.

DESCRIPTION OF EXAMPLES OF REALIZATION OF THE INVENTION

Below is a description of the incorporation of a code and an anti-copy mark into the framework of a document. Even though, with reference to the FIGURE, only the incorporation of an anti-copy mark is described, the method that is the subject of the present invention allows for the incorporation, in similar fashion, of codes into a document.

During a step 100, a document, for example a letterhead, and a framework of a portion of this document, eg a corporate logo, are selected to be printed on the document.

During a step 102, at least one color of the selected framework is selected.

During a step 104, the color density of each selected color for the selected framework is determined.

During a step 106, for each selected color, a digital anti-copy mark is determined, depending on the printing system used to print the document, that has the color density of said color.

The anti-copy mark is formed, for example, of a matrix of square or rectangular cells, the dimensions of said cells causing, when printed with the printing system under consideration, a rate of error cells superior to five percent and preferably superior to ten percent.

In some embodiments, each cell of the matrix can take only two states, eg printed with said color, or not printed with said color.

An error cell is a cell that, on over more than half of its surface, has an error state compared to the corresponding cell in the original digital matrix. An error cell comes from a print error, unpredictable cell by cell, because of the physical limitations of the printing means, in particular in terms of resolution. Thus, the errors are similar to noise, with the signal being formed from the content of the original digital matrix.

Preferably, the anti-copy mark comprises redundancies. The rate of redundancies in the anti-copy matrix is superior to five and preferably superior to ten, so as to correct an error rate superior to forty percent, after making copies of the document. It is noted here that each copy increases the rate of error cells. It is determined whether a document and each anti-copy mark this document carries is the original or a copy, by measuring this error rate by capturing an image of said anti-copy mark, and
- by counting the number of redundancies used to correct these errors and obtain the second message,
- by comparing the captured image to a scaled digital matrix; or
- by comparing the captured image to an image stored in memory and captured at the time the document was printed;

and by comparing this error rate to a predefined limit value, eg ten percent, preferably fifteen percent, of additional error cells compared with the printed original.

It should be noted that different anti-copy marks can be superimposed to form the frameworks of different colors, with the desired color density.

It should be noted that a correction factor can be applied to the desired color to alter the color density of the anti-copy mark, and take into account a color alteration seen before the construction of the printing system, due to the errors expected in printing the anti-copy marks. This is because, compared to a regular framework, the print errors of the anti-copy marks may cause an increase in the number of cells printed, when the density is greater than half, or to reduce same when the density is smaller than half. This effect of accentuating the difference between the density of the anti-copy mark and the average density can be compensated for when printing.

During a step 108, the anti-copy mark is inserted into the framework and the framework thus formed is printed. It should be noted that, because of the determination of the anti-copy mark depending on the target color, the printed anti-copy mark has the color of the framework initially targeted.

During a step 110, an image is taken of at least one and preferably every anti-copy mark printed. In some embodiments, the image is captured at the same time it is printed. For example, for a printer comprising a scanner, this scanner captures an image of each document printed, a few centimeters further along the path of the paper than the printing area.

Next, during a step 112, the image is processed to extract therefrom an error rate for each anti-copy marking and, possibly, a unique identification, eg the 2D Fourier Transform of the values found in the anti-copy mark, by retaining the lowest frequency values, eg the first five or ten terms in each direction, ie 25 to 100 values. A unique identifier of the anti-copy mark, and therefore of the document on which this mark is printed, is obtained.

During an optional step 114, a copy-robust mark is printed and has the unique identifier and/or the error rate determined during step 112. Thus, it is not necessary to have a central database to be able to authenticate the document. By reading the robust mark to determine the document's unique identifier, and by determining again the identifier based on the anti-copy mark, it is possible to verify locally if the document is an original or a copy.

During an optional step 116, the document's unique identifier is stored on a remote server. The document's authenticity can thus be verified remotely.

At least one color is used to insert into a graphic element a code having the desired color density and the particular shape of an anti-copy mark. The redundancies make reading easy and enable measuring degradation.

In this way, the serialization of a graphic object, eg headed paper, is achieved. This document becomes a security document.

Particular device: laser printer.

In some embodiments, printing and scanning are performed successively during the same motion relative to the paper; next, a matrix of cells, larger than the cells of the anti-copy mark representing the scan or an imprint extracted from the scan, eg text printed on paper, is incorporated into the paper.

In this way, the document can be verified by a later scan:
as to its contents (integrity);
as to its authenticity as an original, by the letterhead itself.

Scanning is utilized for archiving. If there is already a code, it is verified then archived. If there is no code, a set of data is added relating to the entire authentication procedure, including the scanner used. In this way, a log for a transaction is produced in a second code linked to the archived file and reproduced as needed. Even if the physical document is lost, a certified copy can be reproduced, since the log (stored file) provides authenticity, including for the anti-copy mark.

The invention claimed is:

1. A method for incorporating a mark in a document, comprising the steps of:
   selecting a framework of the mark to be printed;
   selecting at least one color of the selected framework;
   determining a color density of each selected color for the selected framework;
   for each selected color, determining a digital code comprising, after printing, said density of said each selected color, such that the color density of said code conforms to the color density of the framework;
   incorporating said digital code into the selected framework of a corresponding color such that said digital code is rendered invisible to the human eye; and
   printing the mark having said selected framework and said digital code
   wherein said digital code is a digital anti-copy mark configured to form, after the printing step, a printed anti-copy mark with an error rate higher than five percent.

2. The method according to claim 1, further comprising the step of determining the digital anti-copy mark in accordance with a printing system utilized in the printing step.

3. The method according to claim 2, further comprising the step of forming the digital anti-copy mark of a matrix of square or rectangular cells configured to take a state among a plurality of predefined states, dimensions of said cells causing, after printing with the printing system, a rate of error cells higher than five percent, an error cell being a cell that, on over more than half of its surface, has an error state compared to a corresponding cell in the matrix of the digital anti-copy mark.

4. The method according to claim 1, wherein the digital anti-copy mark comprises redundancies.

5. The method according to claim 4, wherein a rate of redundancies of the digital anti-copy mark is higher than five percent.

6. The method according to claim 1, further comprising the steps of capturing an image of the printed anti-copy mark; determining an error rate by processing the captured image, determining a unique identification of the printed anti-copy mark by processing the captured image; and storing the error rate and the unique identification of the printed anti-copy mark.

7. The method according to claim 6, wherein the steps of printing and capturing the image are performed during same relative motion of a sheet over a printing element and a sensor of a printer-scanner.

8. The method according to claim 6, further comprising the step of printing a copy-robust mark that represents at least one of the unique identification and the error rate of the printed anti-copy mark.

9. The method according to claim 1, further comprising the step of applying a correction factor to alter said color density of the anti-copy mark, in accordance with a color alteration seen before the construction of the printing system so as to compensate a variation in the color density due to printing said digital code compared to printing a regular framework.

10. A method of archiving the document produced in accordance with the method according to claim 1, further comprising the steps of reading the printed digital code; and storing an image of the document and an image of the printed digital code that was read.

\* \* \* \* \*